(12) United States Patent
Ro et al.

(10) Patent No.: US 8,514,926 B2
(45) Date of Patent: Aug. 20, 2013

(54) METHOD AND SYSTEM FOR ENCRYPTION/DECRYPTION OF SCALABLE VIDEO BITSTREAM FOR CONDITIONAL ACCESS CONTROL BASED ON MULTIDIMENSIONAL SCALABILITY IN SCALABLE VIDEO CODING

(75) Inventors: Yong-Man Ro, Daejeon (KR); Yong-Geun Won, Daejeon (KR); Tae-Meon Bae, Daejeon (KR)

(73) Assignees: Samsung Electronics Co., Ltd (KR); Research and Industrial Cooperation Group (KR)

( * ) Notice: Subject to any disclaimer, the term of this patent is extended or adjusted under 35 U.S.C. 154(b) by 1740 days.

(21) Appl. No.: 11/601,189

(22) Filed: Nov. 17, 2006

(65) Prior Publication Data

US 2007/0116277 A1 May 24, 2007

(30) Foreign Application Priority Data

Nov. 17, 2005 (KR) .................... 10-2005-0110472

(51) Int. Cl.
*H04N 11/02* (2006.01)

(52) U.S. Cl.
USPC . 375/240; 370/474; 375/240.08; 375/240.11; 380/37; 380/200; 713/160; 713/193; 715/201

(58) Field of Classification Search
USPC ................... 375/240; 380/37–201; 382/100; 713/160
See application file for complete search history.

(56) References Cited

U.S. PATENT DOCUMENTS

| | | | | |
|---|---|---|---|---|
| 6,810,131 | B2 * | 10/2004 | Nakagawa et al. | 382/100 |
| 6,879,266 | B1 * | 4/2005 | Dye et al. | 341/51 |
| 2003/0133500 | A1 * | 7/2003 | Auwera et al. | 375/240.11 |
| 2006/0069926 | A1 * | 3/2006 | Ginter et al. | 713/194 |
| 2006/0282665 | A1 * | 12/2006 | Zhu et al. | 713/160 |
| 2007/0036354 | A1 * | 2/2007 | Wee et al. | 380/37 |
| 2007/0053513 | A1 * | 3/2007 | Hoffberg | 380/201 |
| 2007/0098162 | A1 * | 5/2007 | Shin | 380/201 |

FOREIGN PATENT DOCUMENTS

| | | |
|---|---|---|
| CN | 1535015 | 10/2004 |
| CN | 1604640 | 4/2005 |

* cited by examiner

*Primary Examiner* — William C Vaughn, Jr.
*Assistant Examiner* — Luis M Perez
(74) *Attorney, Agent, or Firm* — The Farrell Law Firm, P.C.

(57) ABSTRACT

Disclosed is a system and method for encryption of a scalable video coding (SVC) bitstream, which is the next-generation coding technology. The encryption method encrypts Network Abstraction Layer (NAL) data identified according to multidimensional scalability for space, time, and quality with respect to a bitstream created after an SVC encoding, thereby providing a multidimensional scalability function for space, time, and quality even after the encryption, so that the scalability is also maintained even in a bitstream extraction process after the encryption. According to such a scalable encryption method, a specific portion of an encrypted bitstream is removed in a bitstream extraction process, and user access to the bitstream is limited based on a combination of keys for accessing a specific scalability. Therefore, it is possible to protect scalable video content and to access the video content based on scalabilities.

27 Claims, 12 Drawing Sheets

| | C | Descriptor |
|---|---|---|
| residual_block_cabac( coeffLevel, maxNumCoeff ) { | | |
|   coded_block_flag | 3 \| 4 | ae(v) |
|   if( coded_block_flag ) { | | |
|     numCoeff = maxNumCoeff | | |
|     i = 0 | | |
|     do { | | |
|       significant_coeff_flag[ i ] | 3 \| 4 | ae(v) |
|       if( significant_coeff_flag[ i ] ) { | | |
|         last_significant_coeff_flag[ i ] | 3 \| 4 | ae(v) |
|         if( last_significant_coeff_flag[ i ] ) { | | |
|           numCoeff = i + 1 | | |
|           for( j = numCoeff; j < maxNumCoeff; j++ ) | | |
|             coeffLevel[ j ] = 0 | | |
|         } | | |
|       } | | |
|       i++ | | |
|     } while( i < numCoeff-1 ) | | |
|     coeff_abs_level_minus1[ numCoeff-1 ] | 3 \| 4 | ae(v) |
|     coeff_sign_flag[ numCoeff-1 ] | 3 \| 4 | ae(v) |
|     coeffLevel[ numCoeff-1 ] = <br>       ( coeff_abs_level_minus1[ numCoeff – 1 ] + 1 ) * <br>       ( 1 – 2 * coeff_sign_flag[ numCoeff – 1 ] ) | | |
|     for( i = numCoeff-2; i >= 0; i-- ) { | | |
|       if( significant_coeff_flag[ i ] ) { | | |
|         coeff_abs_level_minus1[ i ]  // texture (800) | 3 \| 4 | ae(v) |
|         coeff_sign_flag[ i ]  // sign value (802) | 3 \| 4 | ae(v) |
|         coeffLevel[ i ] = ( coeff_abs_level_minus1[ i ] + 1 ) * <br>           ( 1 – 2 * coeff_sign_flag[ i ] ) | | |
|       } else | | |
|         coeffLevel[ i ] = 0 | | |
|     } | | |
|   } else | | |
|     for( i = 0; i < maxNumCoeff; i++ ) | | |
|       coeffLevel[ i ] = 0 | | |
| } | | |

FIG.8

METHOD AND SYSTEM FOR ENCRYPTION/DECRYPTION OF SCALABLE VIDEO BITSTREAM FOR CONDITIONAL ACCESS CONTROL BASED ON MULTIDIMENSIONAL SCALABILITY IN SCALABLE VIDEO CODING

PRIORITY

This application claims the benefit under 35 U.S.C. 119(a) of an application entitled "Method And System For Encryption/Decryption Of Scalable Video Bitstream For Conditional Access Control Based On Multidimensional Scalability In Scalable Video Coding" filed in the Korean Intellectual Property Office on Nov. 17, 2005 and assigned Serial No. 2005-110472, the entire contents of which are incorporated herein by reference.

BACKGROUND OF THE INVENTION

1. Field of the Invention

The present invention relates to encryption in scalable video coding (SVC), and more particularly to a scalable video encryption method for maintaining a scalability function during the encryption and decryption processes, and a method for conditional access control of a specific bitstream in a scalable video bitstream based on the scalable video encryption method.

2. Description of the Related Art

Scalable video coding (SVC), which is a newly introduced concept, includes spatial scalability, temporal scalability, and quality scalability. According to the spatial scalability, an image is divided into a base layer (e.g. standard-definition television) having a lower spatial resolution and an enhancement layer (e.g. high-definition television) having a higher spatial resolution. The base layer is first encoded, and a difference component between an interpolation component of the base layer and the enhancement layer is encoded, thereby transmitting two encoded bitstreams together. When an image having been subjected to such a process is transmitted, a standard-definition television can display a broadcast for high-definition televisions based on its own screen quality by decoding a base-layer bitstream, while a high-definition television can reproduce a high-definition image by decoding both bitstreams. A digital television and a high-definition television can receive both digital television broadcast and high-definition television broadcast, thereby having complete compatibility with each other.

Similar to spatial scalability, the temporal scalability and quality scalability divide an image into a base layer and an enhancement layer, and transmit an encoded bitstream of the base layer and an encoded bitstream of a difference component between an expanded component of the base layer and the enhancement layer. However, in the case of the temporal scalability and quality scalability, there is a difference in that the temporal scalability divides a base layer and an enhancement layer along a time axis (i.e. in a screen progressing direction), and the quality scalability divides a base layer and an enhancement layer based on resolutions in bit expression for each pixel.

An SVC method capable of ensuring a Quality of Service (QoS) when a video is transmitted based on H.264/MPEG-4 AVC is being standardized by the Joint Video Team (JVT) of ITU-T and ISO/IEC. Such an SVC method shows superior adaptability when various access consumes a video, which cannot be provided by the existing coding schemes.

According to the existing MPEG-4 coding technology, a transcoding process is required whenever it is necessary to adapt contents to a different terminal, and also a very complex adaptation process and a large-capacity server are required for adapting the contents to various terminals. In contrast, according to the SVC method currently being standardized, once a video stream has been encoded, it is possible to make various videos having different spaces, times, and qualities by extracting a desired video stream from the encoded video stream without performing a re-encoding process.

This is because an encoded bitstream has a structure capable of being enhanced in space, time, and quality, as described above, and because video data for various services can be easily created through a bitstream extraction process. A bitstream having such a new structure requires a video encryption scheme suitable for the new structure.

The Intellectual Property Management and Protection (IPMP) of the Moving Picture Expert Group (MPEG) is currently engaged in research to standardize the protection of video content, and various services and encryption schemes according to the IPMP standard have been provided. However, there is only minimum research being conducted with respect to the encryption of a scalable video. Moreover, even scalable video encryption schemes researched until now support only a restricted scalable factor, and do not completely support multidimensional scalability for space, time, and quality.

Therefore, there is a need to develop an encryption method which enables conditional access to a multidimensional scalable video so as to encrypt and decrypt a specific bitstream based on a scalability function, while maintaining the entire scalability function for a scalable video supporting the complete multidimensional scalability for time, space, and quality.

SUMMARY OF THE INVENTION

Accordingly, the present invention has been made to solve at least the above-mentioned problems occurring in the prior art, and an object of the present invention is to provide a method and system for encrypting/decrypting a scalable video bitstream, which permit scalable unit-based conditional access to the bitstream.

Another object of the present invention is to provide a method and system for encrypting/decrypting a scalable video bitstream, which can easily be implemented without increasing the complexity of an encoder and a decoder for encoding and decoding a scalable video.

Still another object of the present invention is to provide a method and system for encrypting/decrypting a scalable video bitstream, which is adapted to a bitstream extraction process which is a scalable video adaptation conversion process.

Still another object of the present invention is to provide a method and system for encrypting/decrypting a scalable video bitstream, which can protect scalable content by encrypting scalable video data supporting a multidimensional scalability.

To accomplish these and other objects, and in accordance with one aspect of the present invention, there is provided a scalable video coding (SVC) bitstream encryption section in a scalable video bitstream encryption/decryption system, wherein the SVC bitstream encryption section includes an SVC bitstream creation unit for creating network abstraction layer (NAL) data corresponding to encoded video data and headers of the NAL data according to preset scalabilities by using an input video signal, and creating an SVC bitstream including the NAL data and the NAL headers; a NAL data identification unit for identifying NAL data to be encrypted from the NAL data included in the SVC bitstream, and extracting scalability information from the NAL data to be encrypted; a key input unit for outputting an encryption key corresponding to the scalability information; and a data encryption unit for encrypting by using the encryption key NAL data having scalability information equal to the extracted scalability information based on an SVC syntax.

In accordance with another aspect of the present invention, there is provided a scalable video coding (SVC) bitstream decryption section in a scalable video bitstream encryption/decryption system, wherein the SVC bitstream decryption section includes an SVC bitstream reception unit for receiving an SVC bitstream which includes a plurality of network abstraction layer (NAL) data corresponding to scalabilities extracted by the bitstream extraction unit; a key input unit for providing a decryption key; a data decryption unit for decrypting the NAL data by using the decryption key; and an SVC bitstream decoding unit for decoding an SVC bitstream including the decrypted NAL data.

In accordance with still another aspect of the present invention, there is provided a method for encrypting a scalable video coding (SVC) bitstream, the method includes encoding an input video signal into an SVC bitstream which includes network abstraction layer (NAL) data and NAL headers according to scalabilities; identifying NAL data to be encrypted in the NAL data included in the SVC bitstream; and receiving encryption keys, which correspond to the NAL data to be encrypted and are used to encrypt the NAL data to be encrypted, and encrypting the NAL data to be encrypted based on an SVC bitstream syntax.

In accordance with still another aspect of the present invention, there is provided a method for decrypting a scalable video coding (SVC) bitstream, the method includes receiving an SVC bitstream which includes network abstraction layer (NAL) data and NAL headers according to scalabilities extracted by the bitstream extraction unit; decrypting encrypted NAL data according to scalabilities when the extracted NAL data include the encrypted NAL data; and decoding the decrypted NAL data and non-decrypted NAL data.

BRIEF DESCRIPTION OF THE DRAWINGS

The above and other objects, features and advantages of the present invention will be more apparent from the following detailed description taken in conjunction with the accompanying drawings, in which:

FIG. 8 is a diagram showing an example of a data structure of an SVC bitstream to which the encryption method according to the present invention is applied;

DETAILED DESCRIPTION OF THE PREFERRED EMBODIMENT

Figure 1A:
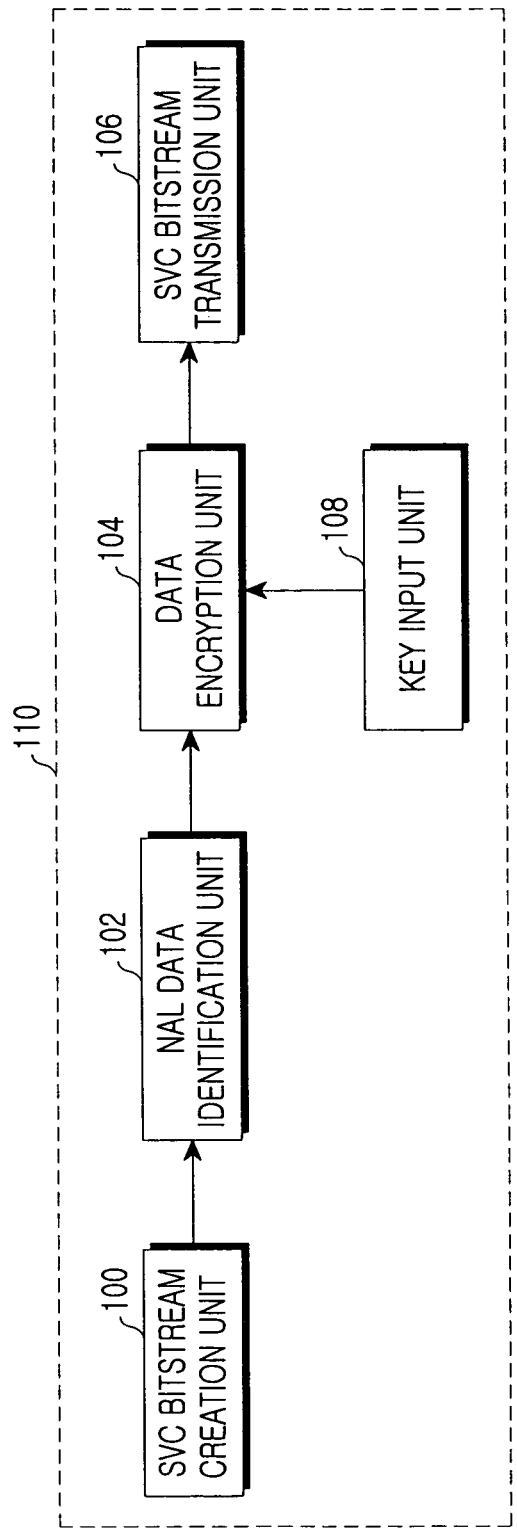
FIG. 1A is a block diagram illustrating the construction of an SVC bitstream encryption section which creates, encrypts, and transmits an SVC bitstream according to the present invention.

Hereinafter, a preferred embodiment of the present invention will be described with reference to the accompanying drawings. It is to be noted that the same elements are indicated with the same reference numerals throughout the drawings. In the following description of the present invention, a detailed description of known functions and configurations incorporated herein will be omitted when it may obscure the subject matter of the present invention.

According to the present invention, an SVC (Scalable Video Coding) bitstream encryption section encodes an input video signal into an SVC bitstream, and identifies Network Abstraction Layer (NAL) data corresponding to a scalability, which will be encrypted, from the encoded SVC bitstream by using a NAL header. It is apparent that the number of scalabilities to be encrypted may be one or more. NAL data corresponding to each scalability to be encrypted are encrypted by means of an encryption key allocated to each corresponding scalability.

Various encryption methods may be used to encrypt NAL data having the scalabilities. For example, a method of extracting a specific value from NAL data of a scalability to be encrypted, and changing and scrambling the specific value may be used. In this case, according to the present invention, a seed value to scramble the NAL data is created, and the NAL data is scrambled by using the seed value. The SVC bitstream encryption section encrypts the seed value, which has been used for the scrambling, and transmits the encrypted seed value together with the SVC bitstream by inserting the encrypted seed value into the NAL data. Generally, video content is encrypted by using the same key for every domain providing the same scalability in one frame. However, as described above, the seed value is not used as a direct key, but is encrypted by a reliable standard encryption scheme and is then inserted into the bitstream. It is thereby possible to use different seeds in domains encrypted with the same key, so video content becomes robust against an attack made through the prediction of the encrypted data.

The term "NAL data" represents data for each scalability element included in each frame of an SVC video stream.

When a scalable video bitstream can support spatial scalabilities for a standard-definition television and a high-definition television (HDTV), the scalable video bitstream includes NAL data of the spatial scalability for the standard-definition television and NAL data of the spatial scalability for the HDTV.

A bitstream extraction unit extracts only NAL data corresponding to partial scalabilities based on the service setup state of a terminal to decode the SVC bitstream. When the terminal to decode the SVC bitstream can use only scalabilities corresponding to the base layer of a standard-definition television level, the bitstream extraction unit extracts only NAL data having the scalability corresponding to the base layer. When the terminal to decode the SVC bitstream can use scalabilities corresponding to all enhancement layers of an HDTV level, the bitstream extraction unit extracts all NAL data from the bitstream. The encryption must be performed based on NAL data in order to be adapted to a bitstream extraction process. NAL data corresponding to a quality enhancement layer is constructed in an FGS data format based on a bit plane coding, in which the FGS data format permits a bitstream to be extracted even from one unit of NAL data. When a bitstream of a quality enhancement layer having the FGS data format is extracted, it must be possible to extract a bitstream even from one unit of NAL data.

An SVC bitstream decryption section receives the extracted NAL data. The SVC bitstream decryption section checks encrypted NAL data by using the NAL headers of the received NAL data, and decrypts the NAL data. When the SVC bitstream encryption section uses an encryption method of changing and scrambling a specific value of NAL data corresponding to a specific scalability, as described above, the SVC bitstream decryption section extracts an encrypted seed value from the encrypted NAL data. The SVC bitstream decryption section decrypts the encrypted seed value by using a key allocated for decryption of the encrypted seed. When encrypted NAL data includes a plurality of scalabilities, the SVC bitstream decryption section extracts a plurality of encrypted seed values. A plurality of decryption keys corresponding to the seed values are required in order to decrypt all the encrypted seed values.

The SVC bitstream decryption section, according to the present invention, descrambles the scrambled NAL data by using the extracted seed value. The SVC bitstream decryption section decodes the descrambled SVC bitstream. As described above, according to the present invention, a users terminal can decrypt only NAL data corresponding to decryption keys stored therein, so that each terminal can be restricted to receiving service of a scalability element corresponding to only the stored decryption key.

FIG. 1A is a block diagram illustrating the construction of an SVC bitstream encryption section which creates, encrypts, and transmits an SVC bitstream according to the present invention.

The SVC bitstream encryption section 110 includes an SVC bitstream creation unit 100, a NAL data identification unit 102, a data encryption unit 104, an SVC bitstream transmission unit 106, and a key input unit 108.

When receiving a video signal, the SVC bitstream creation unit 100 creates a scalable video bitstream by encoding the video signal based on an SVC method capable of providing various scalabilities. The video signal encoding method of the SVC bitstream creation unit 100 based on the SVC method will be described later in detail with reference to FIG. 2.

The NAL data identification unit 102 extracts a NAL header of NAL data included in a bitstream that was encoded based on the SVC method, and determines if the corresponding NAL data is the NAL data to be encrypted. The term "NAL data to be encrypted" represents a NAL unit having actual video data information from among an SVC bitstream. When corresponding NAL data is NAL data to be encrypted, information about a corresponding scalability is extracted from the extracted NAL header of the NAL data. The term "information about a corresponding scalability" represents information about a scalability to which corresponding NAL data is enhanced in one frame. Also, since the NAL data to be encrypted does not include parameter information but data information, the NAL data to be encrypted can be decrypted by an SVC bitstream decryption unit 402.

The data encryption unit 104 encrypts NAL data having the same scalability information as the scalability information which has been extracted from the NAL data to be encrypted, that is identified by the NAL data identification unit 102, by using a key created by the key input unit 108. In this case, the data encryption unit 104 encrypts the NAL data based on an SVC bitstream syntax. The key input unit 108 computes a key to be used for encryption of a scalability to be encrypted according to the scalabilities, and provides the computed key to the data encryption unit 104. When the number of scalabilities to be encrypted is greater than or equal to two, the equal number of keys are created. When receiving the created keys, the data encryption unit 104 encrypts NAL data by using each corresponding key according to the scalabilities to be encrypted. When NAL data corresponding to a specific scalability has been encrypted, the SVC bitstream encryption section 110 transmits an SVC bitstream which includes encrypted NAL data according to the scalability.

The data encryption unit 104 is designed to receive NAL data to be encrypted and to encrypt the NAL data by using an encryption key input from the key input unit 108. In this case, the encryption method may include a symmetrical encryption algorithm, such as a data encryption algorithm (DES), an advanced encryption algorithm (AES), a triple DES, an SEED, etc., or may include an asymmetrical encryption algorithm such as an Rivest Shamir Adleman (RSA), in which the encryption object may include a texture value, a motion vector value, and an Fine Grain Scalability (FGS) value, which are included in a bitstream.

When a bitstream has a large size and requires a complex encoding step, like video content, only a part of bitstream is encrypted so that the efficiency in the encoding step is not influenced by the encryption. According to the present invention, only partial NAL data to be encrypted among a previously-encoded SVC bitstream is changed so as to scramble the partial NAL data of a corresponding scalability to be encrypted by using a scrambling scheme.

Figure 1B:
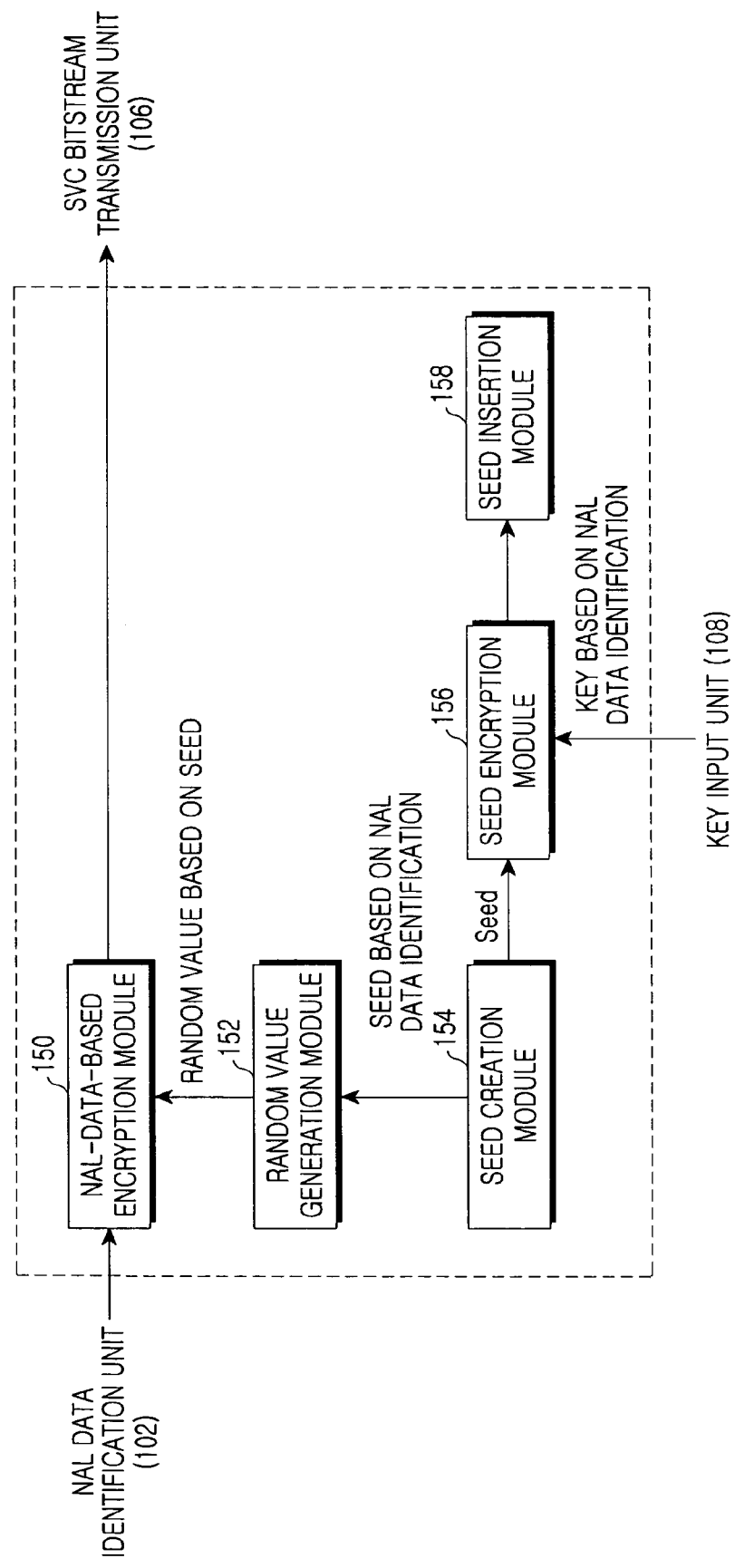
FIG. 1B is a block diagram illustrating the construction of the data encryption unit in the SVC bitstream encryption section according to the present invention.

FIG. 1B is a detailed block diagram illustrating the construction of the data encryption unit 104 of the SVC bitstream encryption section 110 according to the present invention.

The data encryption unit 104 may include a random value generation module 152, a seed creation module 154, a seed encryption module 156, a seed insertion module 158, and a NAL-data-based encryption module 150. The seed creation module 154 creates a seed value, which is a variable capable of changing a specific value of NAL data corresponding to a scalability to be encrypted. The random value generation module 152 generates a pseudo-random value by using the created seed value. The NAL-data-based encryption module 150 changes the specific value of the NAL data corresponding to the scalability to be encrypted by using the pseudo-random value. Accordingly, the NAL-data-based encryption module 150 outputs scrambled NAL data having a noise effect. Also, the NAL-data-based encryption module 150 may encrypt each NAL unit having FGS data in such a manner that a NAL unit having FGS data can be decrypted even if the NAL unit is separated in a bitstream extraction process.

The term "pseudo-random value" represents a random value that can change the specific value to a different value, in which the random value is created through a specific seed. That is, when the same seed exists, the same random value can be created.

The seed encryption module 156 of the SVC bitstream encryption section 110 encrypts the seed value with a key provided from the key input unit 108. The seed insertion module 158 of the SVC bitstream encryption section 110 inserts the encrypted seed value into the scrambled NAL data. Since encryption is applied to a completely-encoded bitstream, the present invention can be easily implemented without increasing the complexity in encoding. Also, according to the present invention, it is possible to transmit a video signal having a scrambling effect for an encrypted scalability element, even without a separate decoding procedure for an encoded bitstream.

Figure 2:
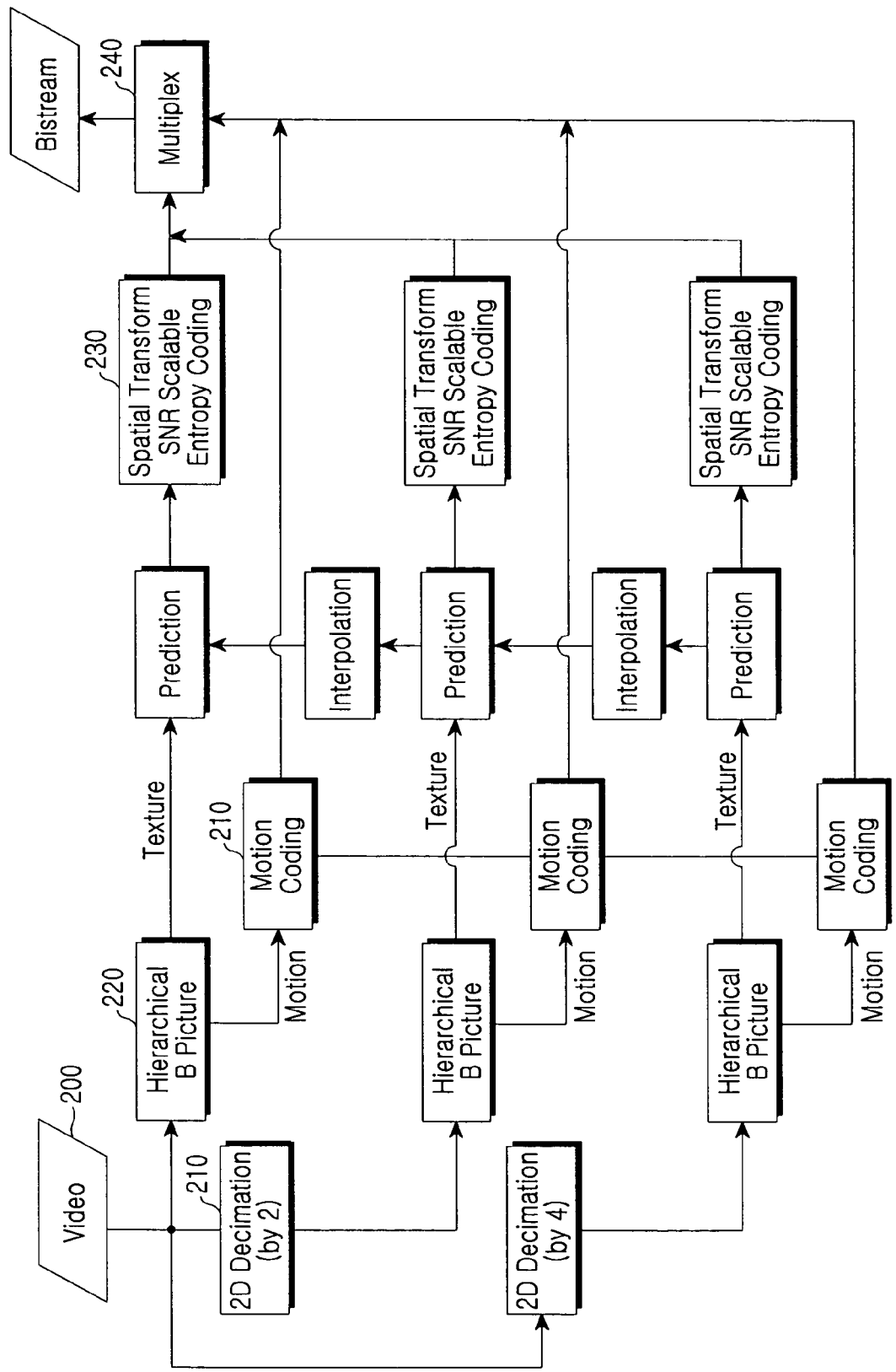
FIG. 2 is a block diagram illustrating a procedure for creating an SVC bitstream by using a received video signal in the SVC bitstream encryption section according to the present invention.

FIG. 2 is a block diagram illustrating a procedure for creating an SVC bitstream by using a received video signal in the SVC bitstream creation unit 100 of the SVC bitstream encryption section according to the present invention.

When receiving a video signal 200, the SVC bitstream creation unit 100 performs a two-dimensional (2D) decimation 210 so as to provide a spatial scalability. In this case, the 2D decimation 210 may be performed multiple times according to the number of spatial scalabilities to be supported. A temporal scalability is constructed by performing a Hierarchical B-picture 220, in which the Hierarchical B-picture 220 is repeatedly constructed by the number of spatial scalabilities. A quality scalability (spatial transform SNR scalable entropy coding) 230 constructs a residual value by FGS coding based on a bit plane. Bitstreams encoded according to space, time, and quality are combined into one bitstream through a multiplexer 240. Since spatial and temporal enhancement layers are constructed with texture values and motion vector values and a quality enhancement layer is constructed with FGS values of a texture in an SVC, encryption must be applied to all types of texture, motion vector, and FGS data in order to protect the whole bitstream.

Figure 3:
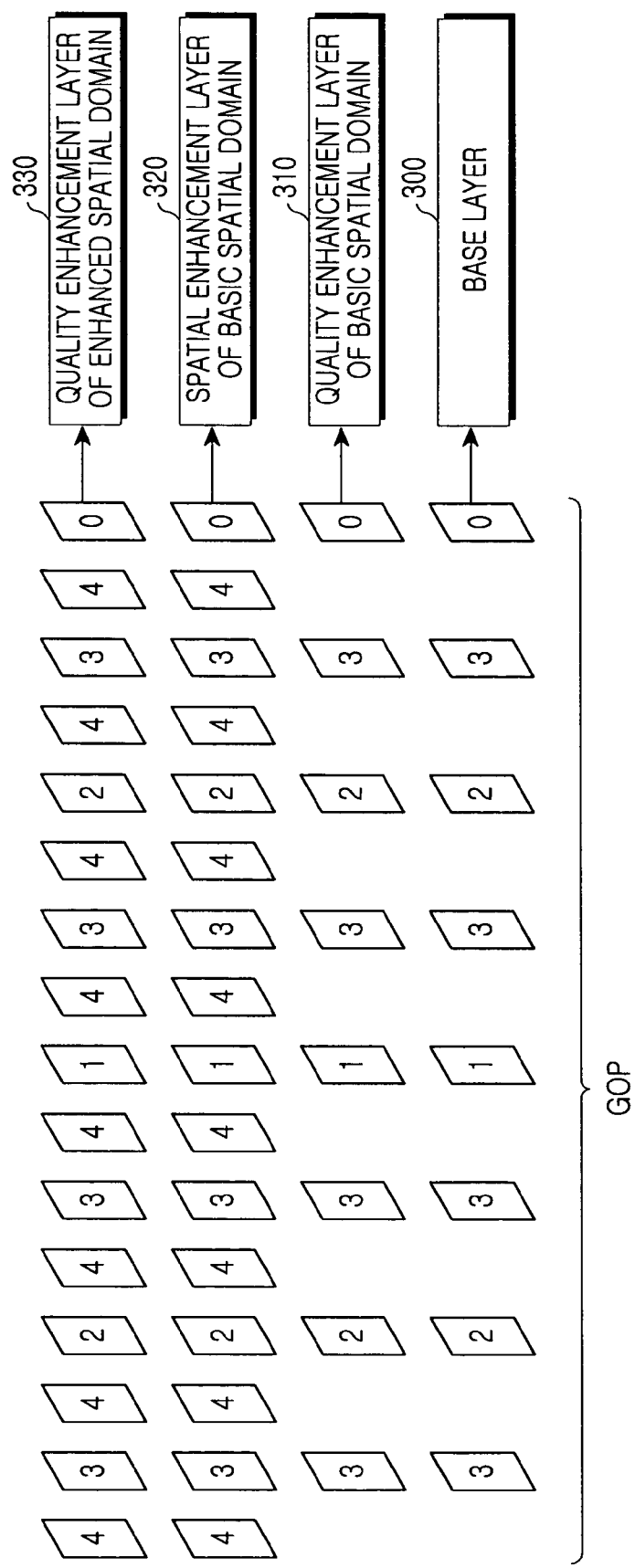
FIG. 3 is a diagram illustrating the structure of an SVC bitstream created according to the present invention.

FIG. 3 is a diagram illustrating the structure of an SVC bitstream created by the SVC bitstream creation unit 100 according to the present invention.

FIG. 3 illustrates the structure of an encoded SVC bitstream that includes two enhancement layers for each of space and quality, in which one group of pictures (GOP) includes 16 frames. In FIG. 3, each quadrangle represents NAL data of a bitstream.

The lowest spatial domain in an SVC bitstream is established as a base layer 300 and is decoded, and a spatial enhancement layer 320 is used upon enhancement of the spatial domain. When the spatial domain is enhanced, a time domain is also enhanced, in which the time domain is implemented through the Hierarchical B-picture. Each NAL data includes a temporal_layer in a NAL header thereof, and each quadrangle number in FIG. 3 represents a temporal_layer number. NAL data of temporal_layer #1 in a GOP is created by using NAL data of temporal_layer #0 in the GOP and NAL data of temporal_layer #0 in the next GOP. NAL data of temporal_layer #2 is created by using the NAL data of temporal_layer #0 and the NAL data of temporal_layer #1. The number of temporal_layers is determined based on the number of frames in a GOP. Through the above-mentioned method, a temporal scalability is created.

When all NAL data is decoded, a video signal having the maximum frame rate which can be provided by the original video signal 200 is decoded. Also, when NAL data of temporal_layer #N, which is the maximum temporal_layer number, is removed, it is possible to obtain a bitstream of a video signal having one half of the frame rate in the temporal domain of the original video signal. When NAL data of both temporal_layers #N and #N−1 are removed, it is possible to obtain a bitstream from which a video signal having one quarter of the frame rate of the original video signal can be decoded. Through such a manner, it is possible to obtain various video signals having different frame rates.

Referring to FIG. 3, on the assumption that the original video signal is a bitstream supporting 30 frames/sec, a video signal of 15 frames/sec is obtained by removing NAL data of temporal_layer #4, and a video signal of 7.5 frames/sec is obtained by removing NAL data of temporal_layers #4 and #3, so that it is possible to provide a temporal scalability. The quality domain is once enhanced into a quality enhancement layer 310 and a spatial domain of the base layer 300, and the enhanced spatial domain is then enhanced into a quality enhancement layer 330. It is possible to achieve enhancement of quality whenever the spatial domain is enhanced. Each enhancement layer may include one or more layers depending on the parameter of an encoder, and such base and enhancement layers are constructed by the NAL data. Such a NAL data unit can be easily adapted for decoding a video signal of a frame unit in a bitstream extraction process.

Figure 4A:
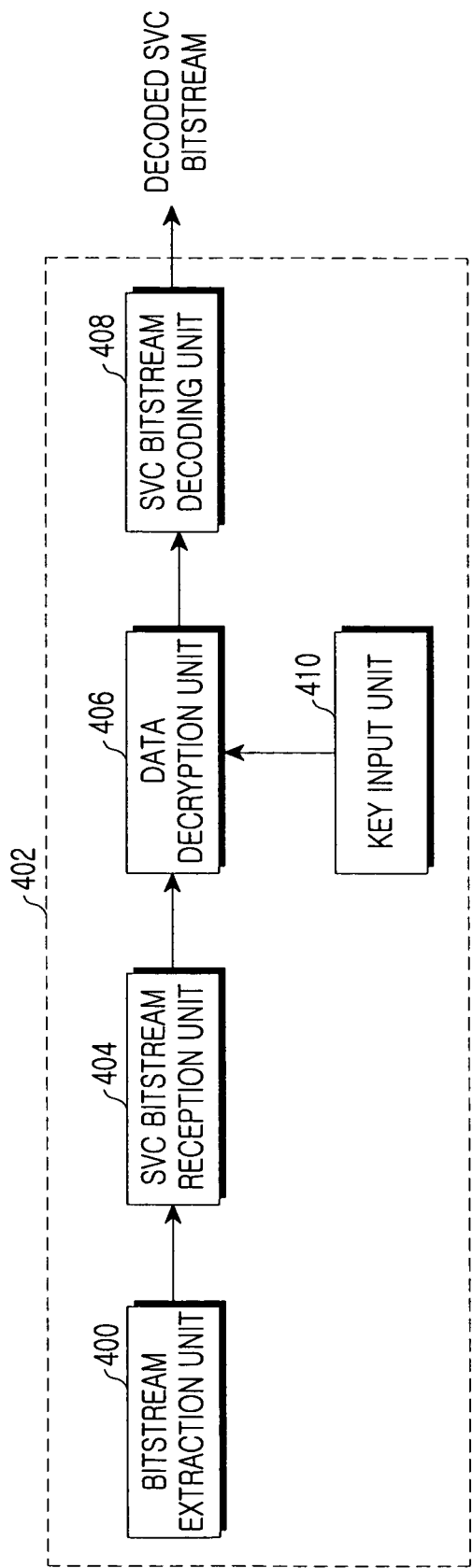
FIG. 4A is a block diagram illustrating the construction of an SVC bitstream decryption section for receiving and decrypting an SVC bitstream according to the present invention.

FIG. 4A is a block diagram illustrating the constructions of a bitstream extraction unit for extracting an encrypted SVC bitstream and an SVC bitstream decryption section for receiving and decrypting the extracted SVC bitstream according to the present invention.

A bitstream extraction unit 400 extracts only the required NAL data according to a service setup state which has been preset in a terminal to decode an SVC bitstream, and inputs the extracted NAL data to the SVC bitstream decryption section 402.

The SVC bitstream decryption section 402 includes an SVC bitstream reception unit 404 for receiving an SVC bitstream, a data decryption unit 406 for decrypting encrypted NAL data when the encrypted NAL data exists, an SVC bitstream decoding unit 408 for decoding an SVC bitstream including the decrypted NAL data, and a key input unit 410 for providing a decryption key required for decrypting the NAL data.

When the SVC bitstream reception unit 404 receives NAL data extracted by the bitstream extraction unit 400, the data decryption unit 406 decrypts the received NAL data by using decryption keys corresponding to the scalabilities. The data decryption unit 406 receives the decryption keys corresponding to the scalabilities from the key input unit 410. Such decryption keys may be provided to the user when the user is permitted to use a specific scalability service.

The data decryption unit 406 performs the decryption operation in a preset order based on the scalabilities included in the bitstream. This is because NAL data having scalabilities are decoded in relation to each other, in such a manner that a scalable bitstream includes a base layer and an enhancement layer while having a structure enhanced on the basis of the base layer. Therefore, the data decryption unit 406 decrypts NAL data in an order required for decoding based on scalability information extracted from a NAL header. Such a process is performed by a decryption algorithm in a procedure in which NAL data is input to the data decryption unit 406. The encryption and decryption of NAL data based on such a relation can reduce a decoding delay time by first decoding decrypted NAL data in a real-time decoder.

When the encrypted NAL data has been decrypted by the data decryption unit 406, the SVC bitstream decoding unit 408 decodes an SVC bitstream including the decrypted NAL data, and outputs the decoded SVC bitstream. When an SVC bitstream including encrypted NAL data is received, if the user terminal does not have a decryption key corresponding to the encrypted NAL data, the encrypted NAL data of the SVC bitstream is decoded by the SVC bitstream decoding unit 408 as the encrypted NAL data is.

However, when encrypted NAL data is decrypted by using a preset key as described above, there is a problem in that a part of SVC bitstream must be separately and continuously decoded. In order to solve such a problem, the method and system according to the present invention uses a scrambling method so as to simplify such a decoding procedure.

Figure 4B:
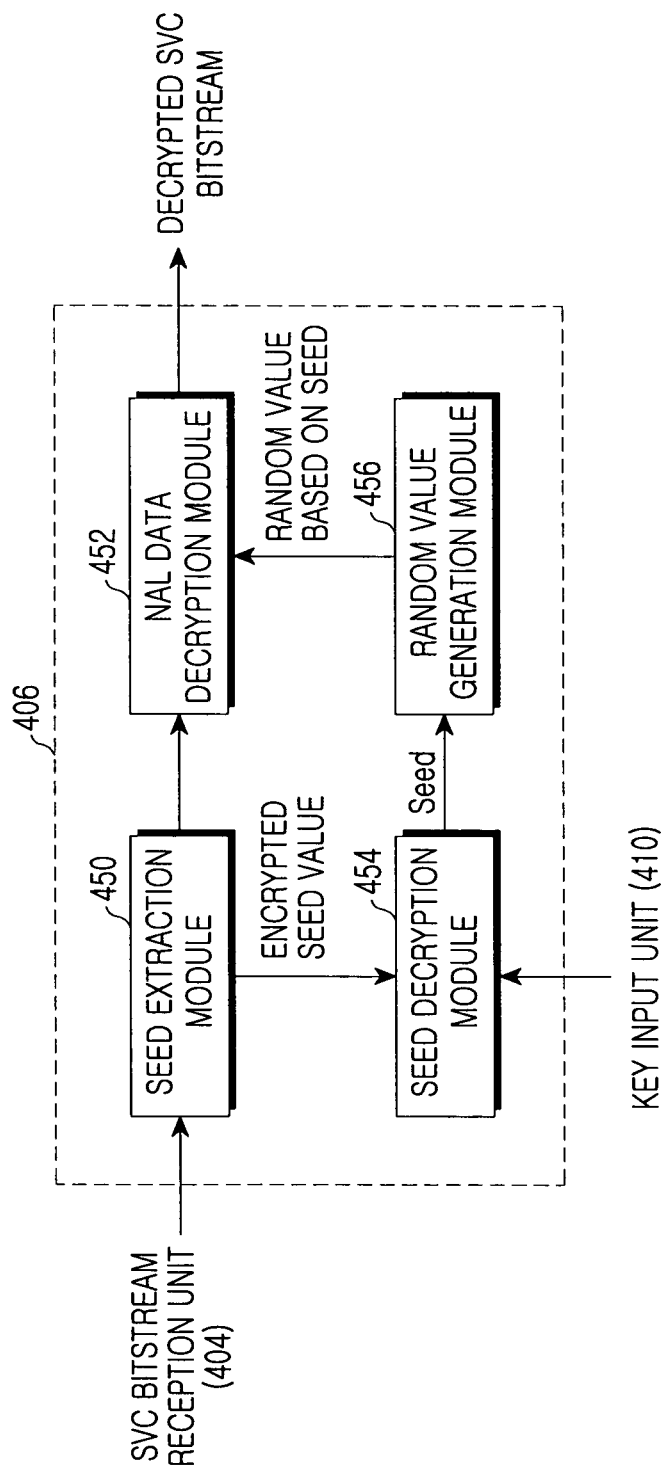
FIG. 4B is a block diagram illustrating the construction of a bitstream extraction unit for extracting an encrypted SVC bitstream and the construction of the SVC bitstream decryption section for receiving and decrypting an extracted SVC bitstream the present invention.

FIG. 4B is a block diagram illustrating the construction of the data decryption unit 406 in the SVC bitstream decryption section 402 according to the present invention, which provides a solution to the above-mentioned problem.

The SVC bitstream decryption section 402 further includes a seed extraction module 450, a seed decryption module 454, a random value generation module 456, and a NAL data decryption module 452. The seed extraction module 450 checks whether or not NAL data received from the SVC bitstream reception unit 404 is encrypted NAL data. When the received NAL data is encrypted NAL data, the seed extraction module 450 extracts an encrypted seed value from the encrypted NAL data. The seed decryption module 454 decrypts the encrypted seed value. In this case, a key input from the key input unit 410 to the seed decryption module 454 is used as a decryption key for decrypting the seed value.

The key input unit 410 stores a plurality of decryption keys according to scalabilities to which the user terminal has been permitted to access. The number of keys necessary for decryption according to each scalability is computed, created, and input to the seed decryption module 454. The plurality of decryption keys correspond to different scalabilities, and each decryption key is used to decrypt NAL data of its corresponding scalability. However, when the SVC bitstream encryption system employs a scrambling scheme of changing a specific value of NAL data in an SVC bitstream, the keys provided from the key input unit 410 are used as keys for restoring the changed specific value. As described above, the scrambling for scalability can be applied to two or more scalability elements. When the number of the scrambled scalabilities is greater than or equal to two, an equal number of seed values are necessary in order to restore all of the scalabilities. Therefore, the number of the keys necessary for decrypting the encrypted seed values is also greater than or equal to two.

If the key input unit 410 does not store all keys corresponding to the seed values, it is impossible to decrypt a seed value, for which a key is not stored in the key input unit 410. In this case, the user is provided with a scalable video which has been decoded maintained with a noise component for a scalability element corresponding to a non-decrypted seed value.

When a seed value has been decrypted, the random value generation module 456 generates a pseudo-random value according to the decrypted seed value in the SVC bitstream decryption section. When the pseudo-random value has been generated, the NAL data decryption module 452 restores the changed specific value of the scrambled NAL data to the original specific value by using the pseudo-random value. When the specific value has been restored, the noise component of the scrambled NAL data disappears so that NAL data having an original scalability element is restored, and the restored NAL data is decoded by the SVC bitstream decoding unit 408.

Figure 5:
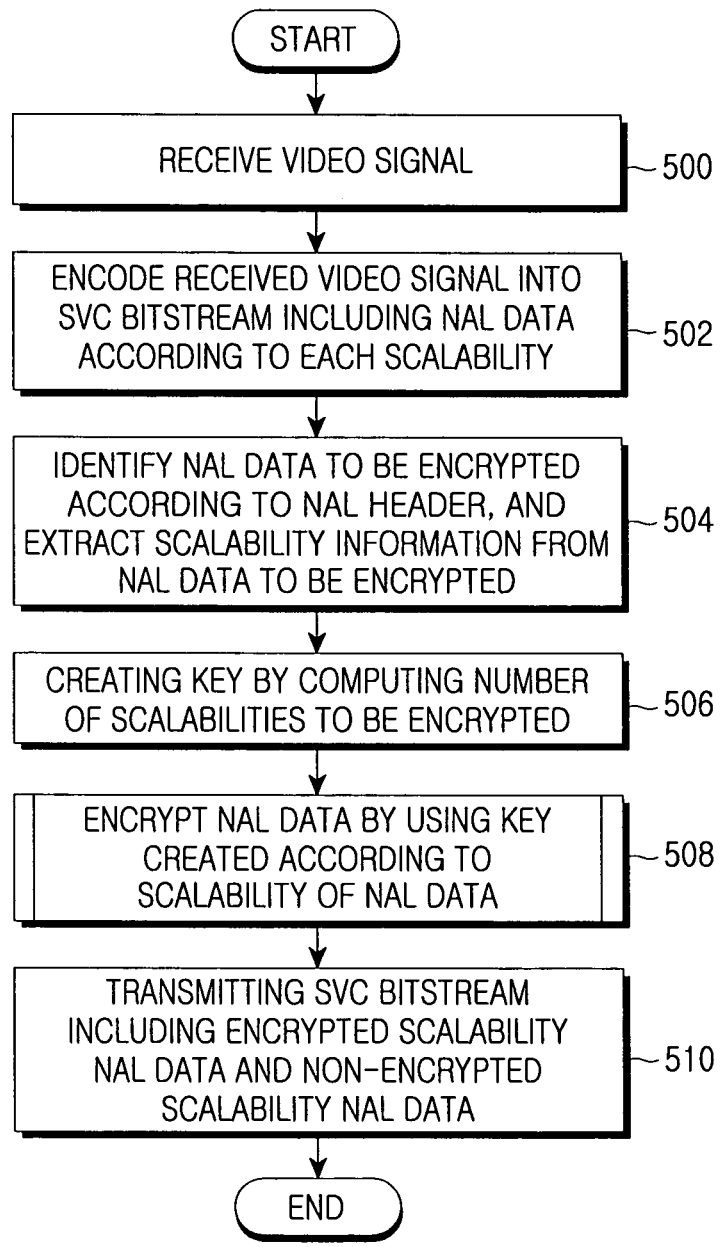
FIG. 5 is a flowchart illustrating the procedure for encrypting and transmitting an SVC bitstream according to NAL data in the SVC bitstream encryption section according to the present invention.

FIG. 5 is a flowchart illustrating the procedure for encrypting an SVC bitstream according to NAL data and transmitting the encrypted SVC bitstream in the SVC bitstream encryption section.

Referring to FIG. 5, when the video signal 200 is input, the SVC bitstream encryption section 110 receives the original video signal 200 (step 500). In step 502, the SVC bitstream encryption section 110 encodes the video signal, which has been received by the NAL data identification unit 102, into an SVC bitstream including NAL data according to scalabilities.

In step 504, the SVC bitstream encryption section 110 identifies NAL data to be encrypted by checking the NAL data included in the encoded SVC bitstream. The SVC bitstream encryption section 110 extracts scalability information from the NAL data to be encrypted. In step 506, the SVC bitstream encryption section 110 computes the number of scalabilities to be encrypted and creates encryption keys according to the scalabilities to be encrypted. In step 508, the SVC bitstream encryption section 110 encrypts NAL data by using the keys created according to the scalabilities of the NAL data. In this case, the SVC bitstream encryption section 110 encrypts the NAL data based on an SVC bitstream syntax.

Figure 6:
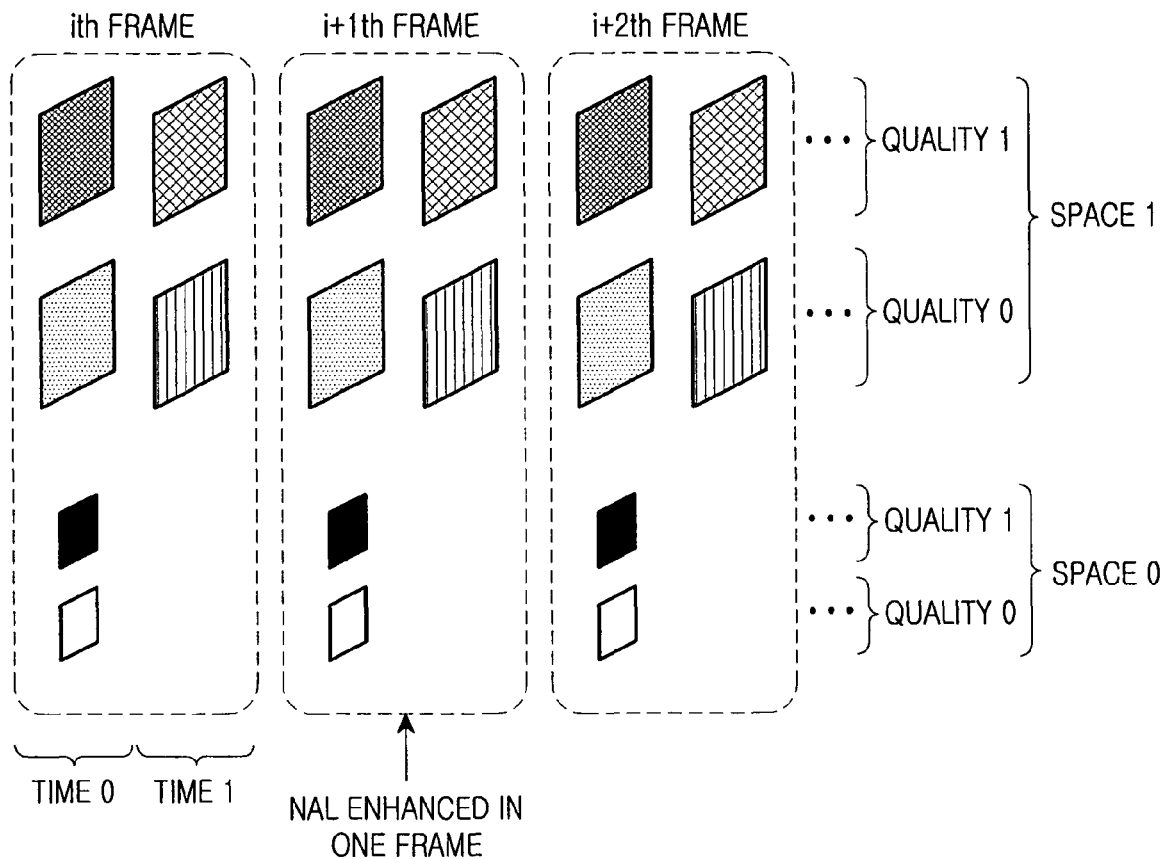
FIG. 6 is a diagram illustrating encrypted NAL data according to the present invention.

FIG. 6 is a diagram illustrating NAL data encrypted by different keys in the SVC bitstream encryption section according to the present invention.

NAL data of an encrypted bitstream is individually encrypted by different keys depending on scalabilities. Therefore, when a video having a specific scalability is decrypted, a combination of specific keys is required.

FIG. 6 shows a conceptual view of NAL data, which are identified so as to provide scalabilities and are encrypted by using a multi-key. A used multi-key is expressed as "key (space, time, and quality)", which is a mathematical function, so as to represent information about actual scalabilities used in the encryption. The "key (space, time, and quality)" is identical to values extracted from "defendency_id (space)", "temporal_layer (time)", and "quality_level (quality)" which are specified in a NAL header, wherein the values represent scalabilities provided by NAL data.

With respect to all NAL data having scalabilities used when one frame is decoded, NAL data to provide different scalabilities is encrypted with different keys, and NAL data to provide an equal scalability is encrypted with an equal key. Video content includes a set of frames, and each frame is individually enhanced to enhance the scalabilities of the video content. Since such scalability enhancement is achieved with a structure to provide a multi-layer scalability of space, time, and quality in one frame, all NAL data contributing to the enhancement in a frame unit must be encrypted with different keys. As a result, it is possible to provide an individual enhancement function for every scalability when a decryption is performed.

Referring to FIG. 6, there are two layers for each of spatial, temporal, and quality scalabilities provided in an SVC method. That is, each of $i^{th}$, $(i+1)^{th}$, and $(i+2)^{th}$ frames includes scalability layers of space 1, space 0, quality 1, quality 0, time 1, and time 0, so that one video frame includes a total of six scalability layers. This means that one frame can be constructed as a video stream having six elements of NAL data, which have different characteristics in space, time, and quality.

In FIG. 6, in order to encrypt a video steam so as to provide perfect scalability, six keys are required for encrypting six elements of NAL data. With respect to a plurality of NAL data to provide an equal scalability in a frame unit, encryption is repeatedly performed by using an equal key. The above description with reference to FIG. 6 is only an example for encryption, the number of keys and NAL data to be encrypted may change depending on the number of scalabilities to be encrypted.

In order to decrypt an SVC bitstream encrypted in the above manner, a bitstream except for a bitstream having a required level, is removed. NAL data corresponding to a level required by the user exist within a range in which one frame can be decoded, so that it is possible to decode one frame only with a key which the user has. For this reason, an encrypted bitstream, which has been subjected to a bitstream extraction process, requires a combination of several keys among the total keys so as to decrypt the encrypted bitstream as much as the scalability required to provide a specific scalability. Therefore it is possible to construct a conditional access control with respect to the specific scalability.

Table 1 shows that unit encryption of NAL data, constructed as shown in FIG. 6, can provide all scalabilities for time, space, and quality, which have been provided by an initial SVC bitstream, through a proper combination of keys. For example, the user needs a key (0, 0, 0) when wanting to access a scalability of space 0, quality 0, and time 0, and the user needs a key (0, 0, 1) and a key (1, 1, 0) when wanting enhancement for space.

TABLE 1

| | | Time | |
|---|---|---|---|
| Space | Quality | Time 0 | Time 1 |
| Space 0 | Quality 0 | {K(0, 0, 0)} | Does not exist |
| | Quality 1 | {K(0, 0, 0), K(0, 0, 1)} | Does not exist |
| Space 1 | Quality 0 | {K(0, 0, 0), K(0, 0, 1), K(1, 0, 0)} | {K(0, 0, 0), K(0, 0, 1), K(1, 0, 0), K(1, 1, 0)} |
| | Quality 1 | {K(0, 0, 0), K(0, 0, 1), K(1, 0, 0), K(1, 0, 1)} | {K(0, 0, 0), K(0, 0, 1), K(1, 0, 0), K(1, 0, 1), K(1, 1, 1), K(1, 1, 0)} |

Table 2 shows accessible and inaccessible cases when various keys are used to access a specific video, which is constructed with CIF (space 1), 30 fps (time 1), and FGS (quality 1), based on the access condition shown in Table 1. It can be noted that all keys required by the access condition must be included in order to access a specific video. When it is impossible to access a specific video, NAL data of a corresponding scalability are not decrypted, thereby being decoded as a noise image.

TABLE 2

| Access Control Condition | Key Allocation | Accessible or Inaccessible |
|---|---|---|
| CIF (space 1) 30fps (time 1) FGS (quality 1) | {K(0, 0, 0)} | Inaccessible |
| | {K(0, 0, 0), K(0, 0, 1)} | Inaccessible |
| | {K(0, 0, 0), K(0, 0, 1), K(1, 0, 0)} | Inaccessible |
| | {K(0, 0, 0), K(0, 0, 1), K(1, 0, 0), K(1, 0, 1)} | Inaccessible |
| | {K(0, 0, 0), K(0, 0, 1), K(1, 0, 0), K(1, 1, 0)} | Inaccessible |
| | {K(0, 0, 0), K(0, 0, 1), K(1, 0, 0), K(1, 0, 1), K(1, 1, 1), K(1, 1, 0)} | Accessible |

The number of encryption keys required based on the number of scalabilities and the number of layers of each scalability, which are provided by an SVC bitstream, may be expressed as Equation (1):

$$Key_{total} = \sum_{n=0}^{N-1} n_q * n_t \quad (1)$$

The number of keys for NAL data of an SVC bitstream is based on the number of scalabilities and the number of layers of each scalability. Therefore, the number of required encryption keys is based on the number of scalabilities and the number of layers of each layer, which are used upon an initial encoding. When it is assumed that an SVC bitstream has an N spatial domain, an $N_q$ quality domain based on the N spatial domain, and an $N_t$ temporal domain based on the N spatial domain, the total number "$KEY_{total}$" of encryption keys used to encrypt a scalable video can be obtained through Equation (1). Also, as shown in Tables 1 and 2, the keys can be obtained by combining or dividing specific keys. Although only two keys "0" and "1" are used, it is possible to provide an access control service, which gives access to various scalabilities, only by combining and allocating the two keys, as shown in Tables 1 and 2.

As described above, a method of encrypting NAL data of a corresponding scalability in step 508 may be a scrambling method of changing a specific value of corresponding NAL data in an encoded SVC bitstream. Step 508 may be a process of changing a specific value of corresponding NAL data in an encoded SVC bitstream. With respect to such a case, a procedure of changing and scrambling only a specific value of corresponding NAL data will be described in detail with reference to FIGS. 7 and 8.

After step 508, the SVC bitstream encryption section 110 transmits an SVC bitstream, which includes NAL data of an encrypted scalability and NAL data of a non-encrypted scalability, to the bitstream extraction unit 400 (step 510).

Figure 7:
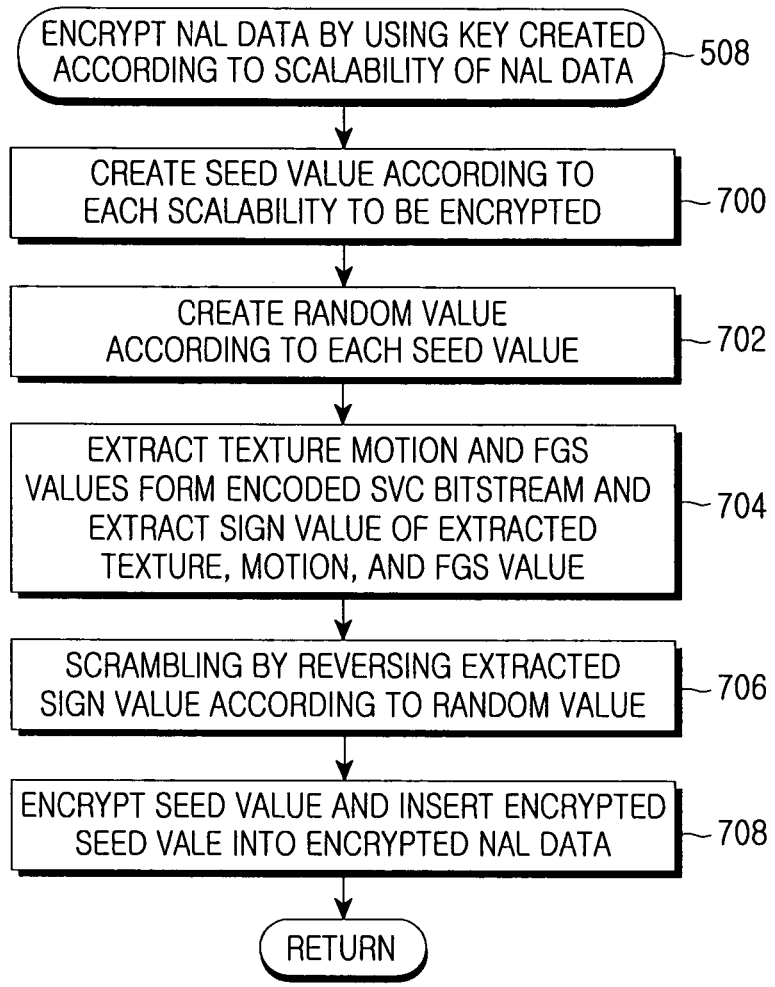
FIG. 7 is a flowchart illustrating the procedure of encrypting NAL data in the SVC bitstream encryption section according to the present invention.

FIG. 7 is a flowchart illustrating the procedure of changing and scrambling a specific value of NAL data in the SVC bitstream encryption section according to the present invention, and FIG. 8 is a diagram showing an example of a data structure of an SVC bitstream to which is applied the encryption method according to the present invention.

Referring to FIG. 7, when a method of changing a specific value of corresponding NAL data in an encoded SVC bitstream is employed in order to encrypt NAL data of a corresponding scalability, the SVC bitstream encryption section proceeds to step 700, in which the seed creation module 154 of the SVC bitstream encryption section creates a seed value corresponding to the extracted scalability. It is apparent that the number of scalabilities to be encrypted may be greater than or equal to two. In this case, an equal number of pieces of scalability information are extracted, and thus two or more seed values are also created.

In step 702, the random value generation module 152 of the SVC bitstream encryption section 110 generates pseudo-random values by using each seed value created by the seed creation module 154. In step 704, the SVC bitstream encryption section 110 extracts a texture value from the encoded SVC bitstream and extracts a sign value of the texture value.

This is possible because according to the proposed SVC bitstream scrambling scheme, when an SVC bitstream is created, the sign values of a texture value, a motion vector value, and an FGS value can be separately extracted before a corresponding bitstream is subjected to a CABAC (Context-based Adaptive Binary Arithmetic Coding) process. Therefore, according to the SVC bitstream encryption system based on the present invention, the sign values of a texture value, a motion vector value, and an FGS value are all encrypted.

Referring to an SVC bitstream syntax shown in FIG. 8, a sign value "coeff_Sign-flag[i]" 802 and a texture value "coeff_abs_level_minus1[i]" 800 are separately included in a bitstream before the bitstream is subjected to the CABAC (Context-based Adaptive Binary Arithmetic Coding) process, which means that the sign values can be separately extracted.

In step 706, the SVC bitstream encryption section 110 reverses a sign value 802 of a texture value by using the generated pseudo-random value, thereby having a noise effect in an image. The reason why the sign value 802 is used is that, when the sign value 802 is reversed, it is possible to change a corresponding texture value to a completely different value by changing just one bit value. In other words, the sign value is used because each sign value generates a more pervasive effect than any other bits of the bitstream. Therefore, the SVC bitstream encryption system of the present invention can have a satisfied noise effect by reversing only the sign of one bit value in the texture value of scalability NAL data to be encrypted, even without complex encoding and decoding processes.

In step 708, the SVC bitstream encryption section encrypts the corresponding seed value by using a preset encryption key. The encryption key is set at different values depending on scalabilities, so as to correspond to each seed value corresponding to each scalability. The SVC bitstream encryption section inserts the encrypted seed value into encrypted scalability NAL data.

Figure 9:
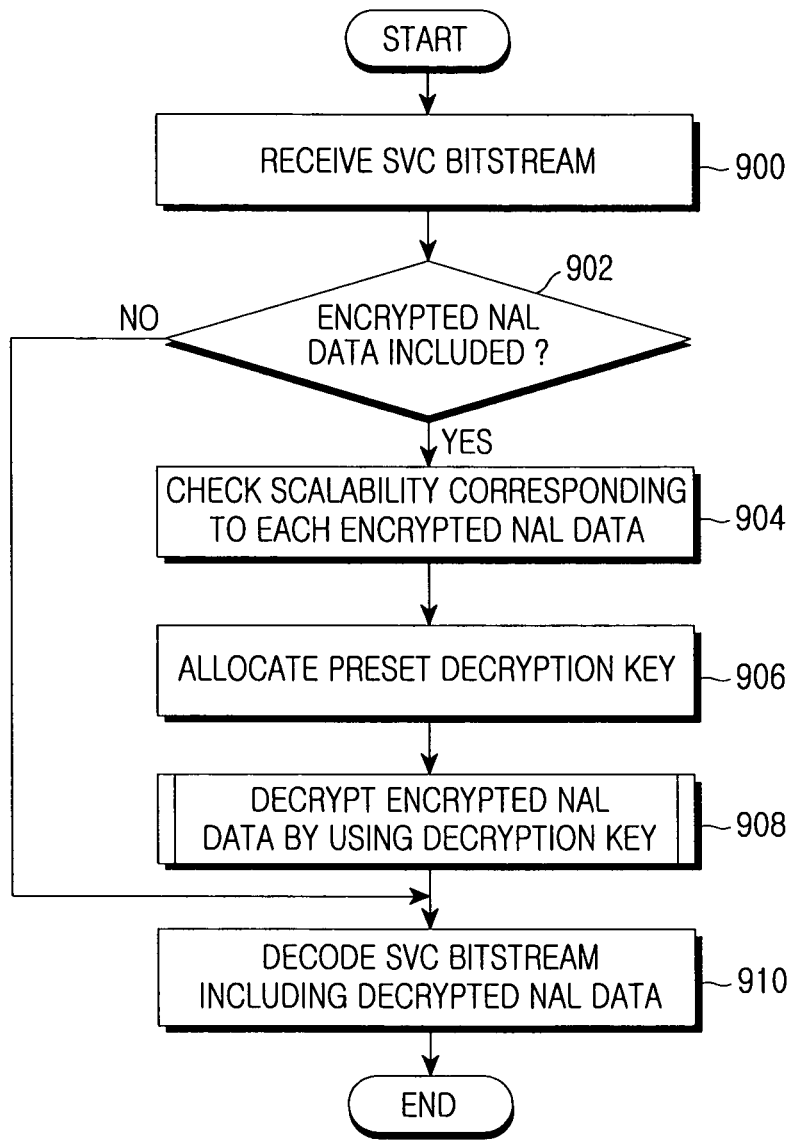
FIG. 9 is a flowchart illustrating the procedure of receiving and decrypting encrypted NAL data and outputting the decrypted NAL data in the SVC bitstream decryption section according to the present invention.

FIG. 9 is a flowchart illustrating the procedure of receiving and decrypting encrypted NAL data and outputting the decrypted NAL data in the SVC bitstream decryption section according to the present invention.

In step 900, the SVC bitstream decryption section 402 receives an SVC bitstream from the SVC bitstream encryption section 110. In step 902, the SVC bitstream decryption section 402 extracts only NAL data required according to a service setup state, i.e., according to a service level determined based on scalabilities which can be provided by the SVC bitstream decryption section 402, from the received SVC bitstream.

In step 904, the SVC bitstream decryption section 402 checks whether or not the received SVC bitstream includes encrypted NAL data. Whether or not encrypted NAL data exist in the received SVC bitstream can be determined by checking the NAL header of each NAL data included in the SVC bitstream.

When encrypted NAL data does not exist in the received SVC bitstream, the SVC bitstream decryption section 402 outputs the NAL data received through the SVC bitstream reception unit 404 as they are (step 910). When it is determined in step 902 that encrypted NAL data exists in the received SVC bitstream, the SVC bitstream decryption section 402 checks scalability information corresponding to the encrypted NAL data (step 906). In step 908, the SVC bitstream decryption section 402 decrypts the encrypted NAL data by using a decryption key provided from the key input unit 410. The SVC bitstream decoding unit 408 of the SVC bitstream decryption section 402 decodes an SVC bitstream including the decrypted NAL data. The decrypted NAL data corresponds to data obtained by encrypting NAL data having data information identified by the NAL data identification unit 102 in the SVC bitstream encryption section 110. Although non-decrypted NAL data exists because a key required for decrypting the NAL data does not exist in the user terminal, the decoding operation can be performed because the NAL data has data information matching with syntax. The SVC bitstream decryption section can decrypt only NAL data, to which the user terminal has been permitted access to, by using a key differently-set depending on scalabilities, so that it is possible to limit user terminal access to a scalable video by the scalability.

Figure 10:
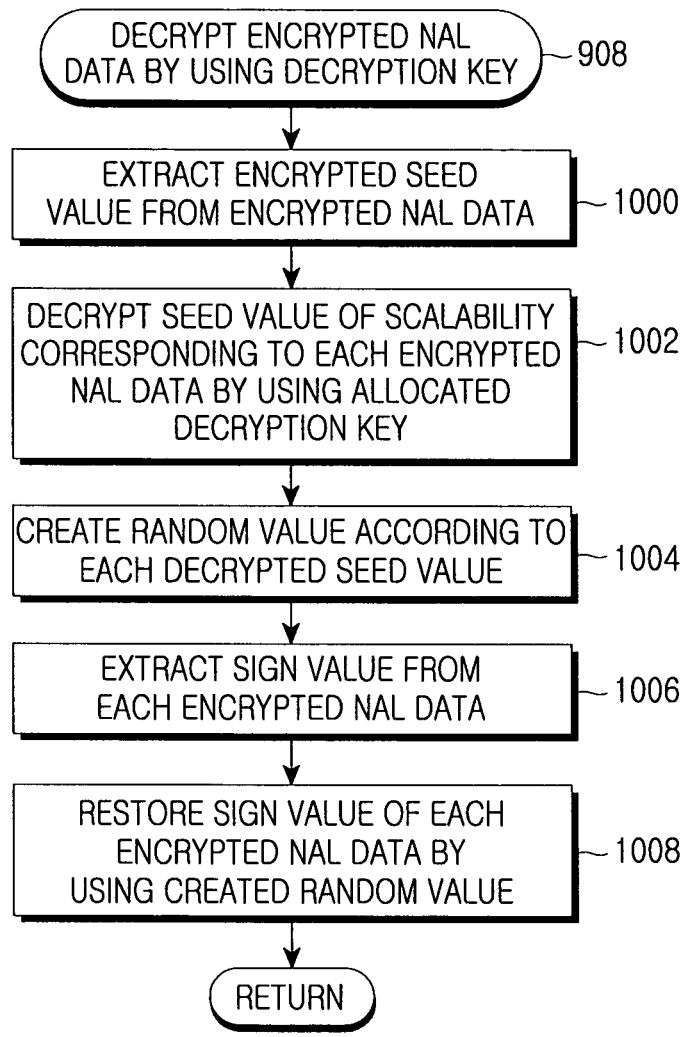
FIG. 10 is a detailed flowchart illustrating the procedure for decrypting encrypted NAL data in the SVC bitstream decryption section according to the present invention.

FIG. 10 is a detailed flowchart illustrating the procedure for decrypting encrypted NAL data by restoring a specific value of corresponding NAL data in a received SVC bitstream by the SVC bitstream decryption section according to the present invention.

When it is determined in step 908 that corresponding scalability NAL data of the SVC bitstream has been encrypted by the manner of changing a specific value of the NAL data, the SVC bitstream decryption section proceeds to step 1000, in which the seed extraction module 450 of the SVC bitstream decryption section extracts encrypted seed values from encrypted NAL data. In step 1002, the SVC bitstream decryption section 402 decrypts the encrypted seed values by using keys pre-stored in the key input unit 410.

In step 1004, the SVC bitstream decryption section 402 inputs the decrypted seed values into the random value generation module 456, thereby creating pseudo-random values corresponding to the seed values.

In step 1006, the SVC bitstream decryption section 402 extracts texture, motion, and FGS values from an encoded SVC bitstream, and extracts the sign values of the texture, motion, and FGS values. In step 1008, the SVC bitstream decryption section 402 restores the sign values, which have been reversed, by using the pseudo-random value, and performs a scrambling process. Accordingly, the present invention has an effect of scrambling an encrypted scalability of an encoded scalable video even without performing a decoding process using a separate encryption key.

As described above, according to the encryption method of the present invention, the scalability function is maintained even after a bitstream encoded by SVC is encrypted, the encrypted bitstream is adapted to a bitstream extraction process, which is the peculiar adaptation conversion process of SVC, without decryption, and it is possible to encrypt all data types provided by an SVC bitstream.

In addition, according to the present invention, at least one or more different keys for encryption are provided regardless of the number of scalabilities for space, time, and quality, which are provided by an SVC bitstream, so that it is possible to restrict a user from accessing scalability of a non-approved scalable bitstream, thereby having an effect capable of protecting scalable video contents by the scalability.

While the present invention has been shown and described with reference to certain preferred embodiments thereof, it will be understood by those skilled in the art that various changes in form and details may be made therein without departing from the spirit and scope of the invention as defined by the appended claims. Particularly, although the present invention has been described about the case of reversing the sign values of texture, motion, and FGS values in order to perform a scrambling operation, this is only an example for maximizing the effect of the present invention, and the scope of the invention is not to be limited by such an embodiment. That is, it will be apparent that a bit value, other than the sign values of texture, motion, can be used instead of the sign values, if change of the bit can create a greater scrambling effect. In addition, although the embodiment of the present invention has been described with respect to the case of changing only sign values, it will be apparent that the present invention can be achieved by changing a value, other than the sign value. Accordingly, the scope of the invention is not to be limited by the above embodiments but by the claims and the equivalents thereof.

What is claimed is:

1. A scalable video bitstream encryption and decryption system, comprising:
   a scalable video coding (SVC) bitstream encryption section for encrypting a scalable video bitstream;
   a bitstream extraction unit for extracting network abstraction layer (NAL) data of a specific scalability from the SVC bitstream; and
   an SVC bitstream decryption section for decrypting the scalable video bitstream transmitted from the SVC bitstream encryption section;
   wherein the SVC bitstream encryption section comprises:
   an SVC bitstream creation unit for creating NAL data and headers of the NAL data according to preset scalabilities by using an input video signal, and
   creating an SVC bitstream including the NAL data and the NAL headers;
   a NAL data identification unit for identifying NAL data to be encrypted from the NAL data included in the SVC bitstream, and
   extracting at least two pieces of scalability information, relating to different scalabilities, from the NAL data to be encrypted;
   a key input unit for outputting encryption keys corresponding to the at least two pieces of scalability information, wherein
   a number of the encryption keys is equal to a number of the at least two pieces of scalability information; and
   a data encryption unit for encrypting units of NAL data having scalability information equal to anyone of the at least two pieces of scalability information based on an SVC syntax by using the encryption keys, wherein
   each of the encryption keys is used for a different one of the at least two pieces of scalability information.

2. The system as claimed in claim 1, wherein the NAL data identification unit identifies the NAL data to be encrypted by using NAL header information of a NAL unit included in the SVC bitstream.

3. The system as claimed in claim 2, wherein the NAL data identification unit extracts the scalability information from the NAL header.

4. The system as claimed in claim 1, wherein the data encryption unit comprises:
   a seed creation module for creating seed values corresponding to each piece of the scalability information;
   an encryption module for encrypting NAL data according to each piece of the scalability information by using the created seed values; and
   a seed encryption module for encrypting the created seed values by using each encryption key and inserting the encrypted seed values into the encrypted NAL data.

5. The system as claimed in claim 4, wherein the encryption module comprises:
   a random value generator for receiving the created seed values from the seed creation module and generating pseudo-random values according to the seed values; and
   a NAL-data-based encryptor for extracting specific values from NAL data to be encrypted, which correspond to each piece of the scalability information, and changing the specific values by using the pseudo-random values.

6. The system as claimed in claim 5, wherein the NAL-data-based encryptor encrypts NAL data based on a NAL unit so that the NAL data can be applied to a bitstream extraction process while maintaining scalability before and after encryption.

7. The system as claimed in claim 5, wherein the NAL-data-based encryptor encrypts NAL data such that a NAL unit having Fine Grain Scalability (FGS) data can be decrypted even when the NAL unit is separated in a bitstream extraction process.

8. The system as claimed in claim 5, wherein the specific value includes sign values of a texture value, a motion vector value, and a Fine Grain Scalability (FGS) data value, which are extracted from the NAL data to be encrypted.

9. The system as claimed in claim 1, wherein—a the number of the encryption keys is obtained by $$Key_{total} = \sum_{n=0}^{N-1} n_q * n_t,$$

where N represents a number of scalabilities in a spatial domain, Nq represents a number of scalabilities in a quality domain based on the N scalabilities in the spatial domain, and
Nt represents a number of scalabilities in a temporal domain based on N scalabilities in the spatial domain.

10. A scalable video bitstream encryption and decryption system, comprising:
   a scalable video coding (SVC) bitstream encryption section for encrypting a scalable video bitstream;
   a bitstream extraction unit for extracting network abstraction layer (NAL) data of a specific scalability from the SVC bitstream; and
   an SVC bitstream decryption section for decrypting the scalable video bitstream transmitted from the SVC bitstream encryption section; wherein
   the SVC bitstream decryption section comprises;
   an SVC bitstream reception unit for receiving an SVC bitstream which includes a plurality of NAL data corresponding to at least two scalabilities extracted by the bitstream extraction unit;
   a key input unit for providing decryption keys corresponding to the at least two scalabilities, wherein
   a number of the decryption keys is equal to a number of the at least two scalabilities;
   a data decryption unit for decrypting the NAL data corresponding to the at least two scalabilities by using the decryption keys, wherein
   each of the decryption keys is used for a different one of the at least two scalabilities; and
   an SVC bitstream decoding unit for decoding the SVC bitstream including the decrypted NAL data.

11. The system as claimed in claim 10, wherein the data decryption unit decrypts NAL data having different scalabilities in an order identical to a decoding order based on relation among the scalabilities.

12. The system as claimed in claim 10, wherein the data decryption unit enables decoding of the SVC bitstream, although an encrypted SVC bitstream is incompletely decrypted because all required decryption keys do not exist.

13. The system as claimed in claim 10, wherein the data decryption unit comprises:
   a seed extraction module for determining if the extracted NAL data has been encrypted and extracting an encrypted seed value for decrypting the NAL data when the NAL data has been encrypted; and
   a key input module for outputting a decryption key for decrypting the encrypted seed value.

14. The system as claimed in claim 13, wherein the data decryption unit comprises:

a seed decryption module for decrypting encrypted seed values by using the decryption keys; and a decryption module for decrypting each of the NAL data based on the at least two extracted encrypted scalabilities by using the decrypted seed values.

15. The system as claimed in claim 14, wherein the data decryption unit comprises:

a random value generator for receiving the decrypted seed values from the seed decryption module and generating pseudo-random values according to the seed values;

and a NAL data decryptor for extracting specific values from the at least two encrypted NAL data and restoring the specific values by using the pseudo-random values.

16. The system as claimed in claim 15, wherein the specific value includes sign values of a texture value, a motion vector value, and a Fine Grain Scalability (FGS) data value, which are extracted from the NAL data to be encrypted.

17. The system as claimed in claim 16, wherein the SVC bitstream decoding unit adds noise during a decoding operation when a part of NAL data has not been decrypted, so that a degree of noise is changed depending on a number of scalabilities corresponding to non-decrypted NAL data.

18. The system as claimed in claim 10, wherein the key input module computes the number of the decryption keys based on $$Key_{total} = \sum_{n=0}^{N-1} n_q * n_t,$$

wherein N represents a number of scalabilities in a spatial domain, Nq represents a number of scalabilities in a quality domain based on the N scalabilities in the spatial domain, and Nt represents a number of scalabilities in a temporal domain based on the N scalabilities in the spatial domain.

19. A method for encrypting a scalable video coding (SVC) bitstream by an SVC bitstream encryption section in a scalable video bitstream encryption and decryption system, the SVC bitstream encryption section for encrypting a scalable video bitstream, a bitstream extraction unit for extracting network abstraction layer (NAL) data of a specific scalability from the SVC bitstream, and a decryption section for decrypting the scalable video bitstream transmitted from the SVC bitstream encryption section, the method comprising the steps of:

encoding an input video signal into an SVC bitstream which includes NAL data and NAL headers according to scalabilities;

identifying NAL data to be encrypted in the NAL data included in the SVC bitstream;

extracting at least two pieces of scalability information relating to different scalabilities from the NAL data to be encrypted;

receiving encryption keys, which correspond to the at least two pieces of scalability information wherein a number of the encryption keys is equal to a number of the at least two pieces of scalability information; and encrypting units of NAL data having scalability information equal to anyone of the at least two pieces of scalability information based on an SVC bitstream syntax by using the encryption keys wherein each of the encryption keys is used for a different one of the at least two pieces of scalability information.

20. The method as claimed in claim 19, wherein, in the NAL data identification step, the NAL data to be encrypted is identified by using the NAL header, and scalability information is extracted from the NAL data to be encrypted.

21. The method as claimed in claim 19, wherein the encryption step comprises: creating seed values corresponding to the scalability information;

generating pseudo-random values according to the created seed values;

extracting specific values from the NAL data to be encrypted;

encrypting the NAL data to be encrypted by changing the extracted specific values using the pseudo-random values; and encrypting the seed values of corresponding scalabilities by using the encryption keys.

22. The method as claimed in claim 21, wherein the specific value includes sign values of a texture value, a motion vector value, and a Fine Grain Scalability (FGS) data value, which are extracted from the NAL data to be encrypted.

23. A method for decrypting a scalable video coding (SVC) bitstream by an SVC bitstream decryption section in a scalable video bitstream encryption and decryption system, that includes a SVC bitstream encryption section for encrypting a scalable video bitstream, a bitstream extraction unit for extracting a network abstraction layer (NAL) unit of a required specific scalability from the SVC bitstream, and the SVC bitstream decryption section for decrypting the scalable video bitstream transmitted from the SVC bitstream encryption section, the method comprising the steps of:

receiving an SVC bitstream including a plurality of NAL data corresponding to at least two scalabilities extracted by the bitstream extraction unit;

receiving decryption keys corresponding to the at least two scalabilities, wherein a number of the encryption keys is equal to a number of the at least two scalabilities;

decrypting encrypted NAL data by using the decryption keys, wherein each of the encryption keys is used for a different one of the at least two scalabilities;

and decoding the SVC bitstream including the decrypted NAL.

24. The method as claimed in claim 23, wherein, in the decryption step, NAL data having different scalabilities are decrypted in an order equal to a decoding order of the SVC bitstream in relation to the scalabilities.

25. The method as claimed in claim 23, wherein the decryption step comprises:

extracting seed values of scalabilities corresponding to the encrypted NAL data from the encrypted NAL data;

decrypting the seed values by using a pre-allocated decryption key when the seed values have been encrypted;

generating pseudo-random values according to the decrypted seed values;

extracting specific values from the encrypted NAL data according to scalabilities;

restoring the extracted specific values by using the pseudo-random values generated according to the seed values based on each corresponding scalability; and restoring the encrypted NAL data.

26. The method as claimed in claim 25, wherein the specific value includes sign values of a texture value, a motion vector value, and a Fine Grain Scalability (FGS) data value, which are extracted from the encrypted NAL data.

27. The method as claimed in claim 26, wherein, in the decoding step, noise is added when a part of NAL data has not been decrypted, so that a degree of noise is changed depending on a number of scalabilities corresponding to non-decrypted NAL data.

* * * * *